United States Patent [19]
Desnoyers et al.

[11] Patent Number: 5,923,840
[45] Date of Patent: Jul. 13, 1999

[54] METHOD OF REPORTING ERRORS BY A HARDWARE ELEMENT OF A DISTRIBUTED COMPUTER SYSTEM

[75] Inventors: Christine Marie Desnoyers, Pine Bush, N.Y.; Derrick LeRoy Garmire, Kingston, N.Y.; Antoinette Elaine Herrmann, Poughkeepsie, N.Y.; Francis Alfred Kampf, Fairfax, Vt.; Robert Frederick Stucke, Saugerties, N.Y.

[73] Assignee: International Business Machines Corporation, Armonk, N.Y.

[21] Appl. No.: 08/831,255

[22] Filed: Apr. 8, 1997

[51] Int. Cl.⁶ ..................................................... G06F 11/00
[52] U.S. Cl. ............................... 395/185.01; 395/182.02; 395/185.1
[58] Field of Search ................ 395/185.01, 182.02, 395/183.14, 184.01, 183.21, 183.19, 185.09, 185.1

[56] References Cited

U.S. PATENT DOCUMENTS

| | | | |
|---|---|---|---|
| 3,242,058 | 3/1966 | Ganley et al. | 202/176 |
| 4,503,535 | 3/1985 | Budde et al. | 395/184.01 |
| 4,510,594 | 4/1985 | Johnson, Jr. | 370/15 |
| 4,546,467 | 10/1985 | Yamamoto | 370/13 |
| 4,660,201 | 4/1987 | Nakamura | 371/61 |
| 4,769,811 | 9/1988 | Eckberg, Jr. et al. | 370/60 |
| 4,777,595 | 10/1988 | Strecket et al. | 395/200.66 |
| 4,862,461 | 8/1989 | Blaner | 371/33 |
| 4,970,714 | 11/1990 | Chen et al. | 370/17 |
| 4,993,015 | 2/1991 | Fite, Jr. | 370/16 |
| 5,016,243 | 5/1991 | Fite, Jr. | 370/16 |
| 5,031,211 | 7/1991 | Nagai et al. | 379/221 |
| 5,117,352 | 5/1992 | Falek | 395/575 |
| 5,155,842 | 10/1992 | Rubin | 395/575 |
| 5,157,667 | 10/1992 | Carusone, Jr. et al. | 395/183.21 |
| 5,161,156 | 11/1992 | Baum et al. | 371/7 |
| 5,218,712 | 6/1993 | Cutler et al. | 395/800 |
| 5,271,000 | 12/1993 | Engbersen et al. | 370/13 |
| 5,274,638 | 12/1993 | Michihira et al. | 370/85.6 |
| 5,289,460 | 2/1994 | Drake, Jr. et al. | 370/17 |
| 5,301,185 | 4/1994 | Cherry | 370/16.1 |
| 5,307,354 | 4/1994 | Cramer et al. | 395/182.02 |
| 5,487,061 | 1/1996 | Bray | 370/13 |
| 5,546,391 | 8/1996 | Hochschild et al. | 370/60 |
| 5,613,069 | 3/1997 | Walker | 395/200.15 |

FOREIGN PATENT DOCUMENTS 0 730 355 A2   4/1996   European Pat. Off. .......... H04L 1/00

OTHER PUBLICATIONS

"Generic Alerts for X.25 Packet Layer Control Level Errors," IBM Technical Disclosure Bulletin, vol. 32, No. 9B, pp. 196–198 (Feb. 1990).

"Generic Alerts for X.25 Link Access Protocol Balanced and X.25 Physical Level Errors," IBM Technical Disclosure Bulletin, vol. 32, No. 9B, pp. 189–191 (Feb. 1990).

Derrick Garmire, "IBM Powerparallel Technology Briefing: Interconnection Technologies for High–Performance Computing (RS/6000 SP)," (Jun. 6, 1996).

Derrick Garmire, "The RS/6000 SP High–Performance Communication Network," (Jun. 6, 1996).

*Primary Examiner*—Ly V. Hua
*Attorney, Agent, or Firm*—Floyd A. Gonzales, Esq.; Heslin & Rothberg, P.C.

[57] ABSTRACT

An error message is generated by a hardware element of a distributed computer system, when an error is detected. The error message is then forwarded from the hardware element to one or more designated processing nodes of the distributed computer system. The hardware element includes, for instance, a switch element or a communications adapter adapted to report detected errors.

6 Claims, 7 Drawing Sheets

METHOD OF REPORTING ERRORS BY A HARDWARE ELEMENT OF A DISTRIBUTED COMPUTER SYSTEM

TECHNICAL FIELD

This invention relates, in general, to distributed computer systems and, in particular, to using hardware components of those systems to report errors detected by the hardware components.

CROSS REFERENCE TO RELATED APPLICATION

This application contains subject matter which is related to the subject matter of the following application, which is assigned to the same assignee as this application and filed on the same day as this application. The below listed application is hereby incorporated herein by reference in its entirety:

"A System Of Reporting Errors By A Hardware Element Of A Distributed Computer System," by Desnoyers et al., Ser. No. 08/838,389, (Docket No. P09-97-045).

BACKGROUND ART

Typically, a distributed computer system includes a number of processors coupled to one another by an interconnection network. One of the processors has the task of monitoring for device failures within the computer system. For example, a heartbeat type protocol is used to periodically poll each of the devices in the system to determine if it is still active. If a once active device is no longer active, then the processor probes the device to find out if an error has occurred. The time required to poll all of the devices grows proportionately with the increase in the size of the system.

When a failure is detected, the processor needs to communicate with the failed device to determine the cause of the failure, as well as to initiate the appropriate recovery scheme. For example, if a failure occurs within the interconnection network, then the processor needs to communicate with the network to retrieve fault information captured by the interconnection network and to initiate appropriate recovery. However, since there is no guarantee that a direct connection exists between the interconnection network and the processor, alternate mechanisms are generally used for this communication.

The use of a processor to search and retrieve fault information in such a manner, and the further use of alternate mechanisms to retrieve the fault information when the error occurs in an interconnection network are less efficient than desired. Thus, a need exists for a more efficient way of reporting errors to a processor for servicing. In particular, a need exists for a mechanism in which the reporting is performed by, for instance, the interconnection network itself, instead of having the processor search and retrieve the fault information.

SUMMARY OF THE INVENTION

The shortcomings of the prior art are overcome and additional advantages are provided through the provision of a method of reporting errors in a distributed computer system. An error message is generated by a hardware element of the distributed computer system, when an error is detected. The error message is then forwarded from the hardware element to a first designated processing node of the distributed computer system.

In one example, the hardware element includes either a switch element or a communications adapter.

In another example, the generating of the error message includes creating a service packet, which includes the error message and a route to the first designated processing node.

In yet another embodiment, the hardware element collects additional errors prior to receiving an indication that the error message has been received by the first designated processing node. Error messages corresponding to the additional errors are then forwarded to the first designated processing node and/or a second designated processing node, when the hardware element acknowledges receipt of the indication that the error message was received by the first designated processing node.

In a further embodiment of the present invention, the error message is further sent from the hardware element to a second designated processing node of the distributed computer system.

The error reporting capability of the present invention eliminates the need to monitor the devices for failures, resulting in less contention for routes or segments of route paths. Additionally, the error reporting capability of the present invention prevents the cluttering of the system with subsequent error packets and allows the rest of the system to function normally. The error reporting capability of the present invention is performed using hardware within the system, rather than software or any processor logic.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, a reporting capability is provided in which a hardware element of a distributed computer system reports an error condition to a designated processing node of the computer system. The hardware element reports the error without the need of software or processor logic.

Figure 1:
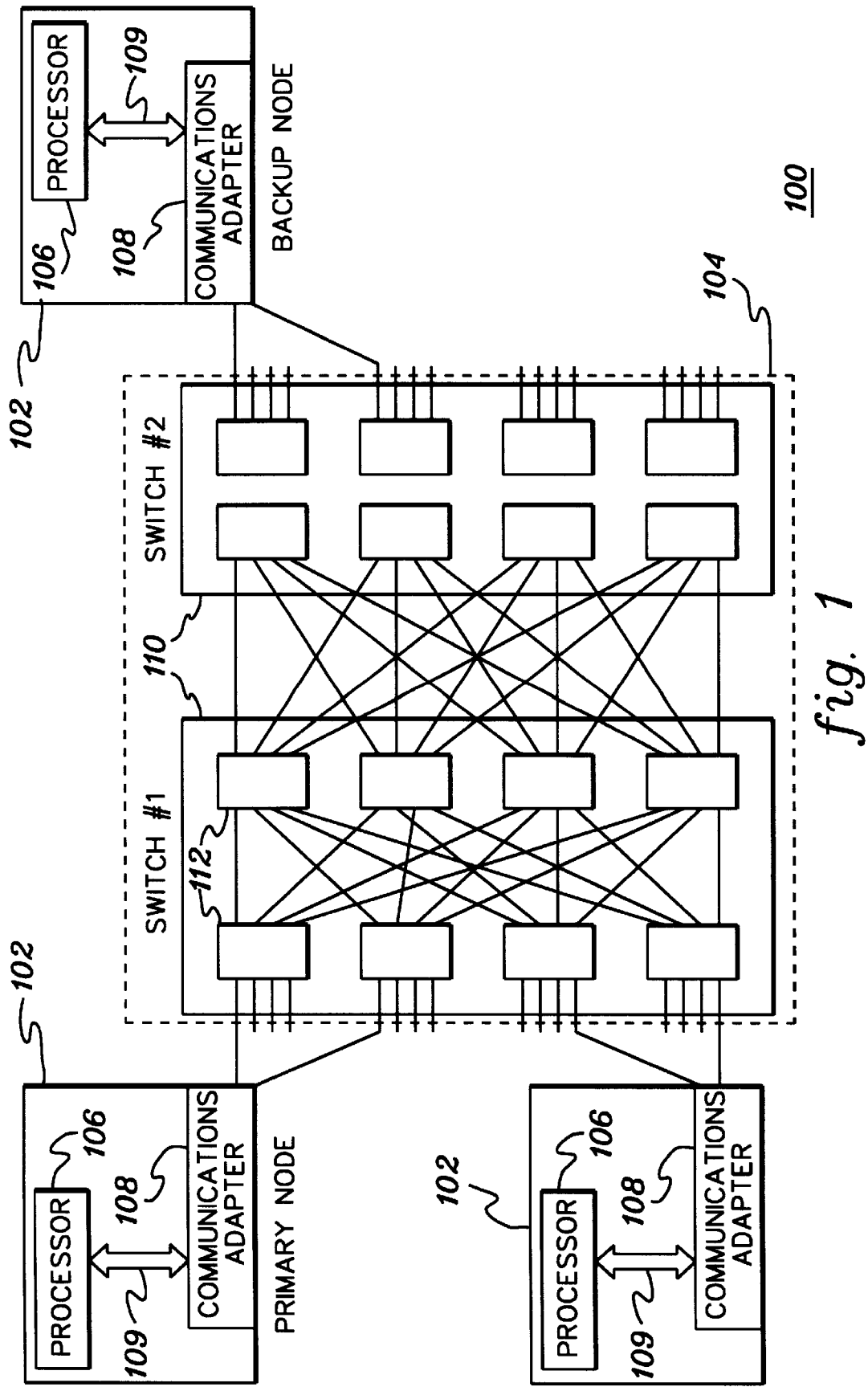
FIG. 1 depicts one example of a distributed computer system incorporating and using the reporting capability of the present invention.

One example of a distributed computer system incorporating and using the reporting capability of the present invention is depicted in FIG. 1. In one embodiment, a distributed computer system 100 is a RISC System/6000 Scalable POWERparallel System offered by International Business Machines Corporation, and includes a plurality of processing nodes 102 coupled to an interconnection network 104. One example of the processing nodes and the interconnection network is described below.

A processing node includes, for instance, a processor 106, such as an RS/6000 processor offered by International Business Machines Corporation, and a communications adapter 108 coupled to the processor via, for instance, a system input/output (I/O) bus 109. The communications adapter is an input/output device used in communicating from one processor to another processor within the system and/or from the interconnection network to a processor. One example of a communications adapter is described in detail further below with reference to FIG. 6.

Processing nodes 102 are coupled to interconnection network 104, which includes, for instance, the Scalable POWERparallel Switch (SP Switch) provided by International Business Machines Corporation. One embodiment of an interconnection network is described below, as well as in the following white papers: "IBM POWERparallel Technology Briefing: Interconnection Technologies for High-Performance Computing (RS/6000 SP)", by Derrick Garmire (Jun. 06, 1996); and "The RS/6000 SP High-Performance Communication Network", by Derrick Garmire (Jun. 06, 1996), each of which is hereby incorporated herein by reference in its entirety.

The interconnection network connects the processors of the distributed computer system together such that the processors can send and receive messages simultaneously. In one embodiment, interconnection network 104 includes one or more switch boards 110, and each of the switch boards is coupled to processing nodes and/or to another switch board. For instance, in FIG. 1, Switch Board #1 is connected to a first processing node, referred to herein as a primary node, and to one or more other processing nodes. It is further connected to Switch Board #2, in order to increase the scalability of the system. Switch Board #2 is connected to Switch Board #1 and to at least one other processing node 102.

Figure 2:
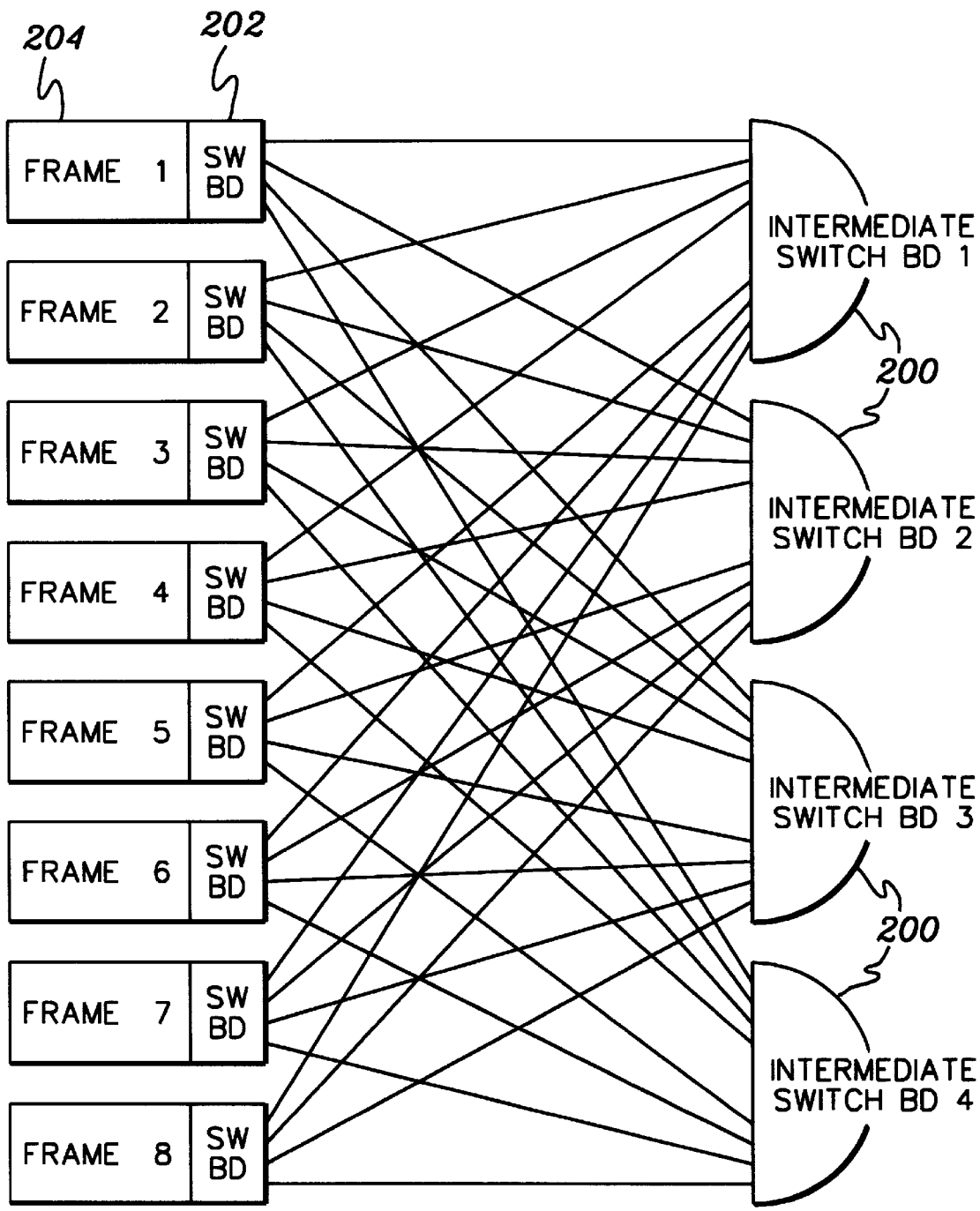
FIG. 2 depicts one embodiment of an interconnection network of the distributed computer system of FIG. 1, which includes intermediate switch boards, in accordance with the principles of the present invention.

In larger configurations, additional levels of intermediate switch boards can also be included to further increase the scalability of the system (see FIG. 2). In the example depicted in FIG. 2, intermediate switch boards 200 are connected to switch boards 202 located within frames 204. Each frame includes, for instance, two to sixteen processing nodes, as well as the switch board. The intermediate switch boards connect switch boards to other switch boards, and not switch boards to processing nodes. As shown in FIG. 2, the connections to the processing nodes are by switch boards 202 and not the intermediate switch boards.

Referring back to FIG. 1, in one example, each switch board 110 includes a plurality of switch elements 112 (e.g., eight) that provide connection points for each of the nodes connected thereto, as well as connection points for other switch elements. The configuration of the switch elements allows for multiple paths between processing nodes such that single path or element failures do not isolate nodes from each other. In particular, each processing node has two connections to the switch elements, and each connection is an input/output connection.

In accordance with the principles of the present invention, each switch element 112 is initialized using, for instance, a switch initialization packet forwarded to the switch element by a designated processing node (e.g., a primary node) within distributed computer system 100. In one embodiment, the initialization service packet includes a command, indicating that this packet is a switch initialization packet and therefore, is not to be passed on to the next stage in the switching network; a primary route indicating a route to a first designated processing node of the system (e.g., a primary node); a secondary route indicating either a second route to the first designated processing node or a route to a second designated processing node (e.g., a backup node); an identifier of the switch element; and various other initialization data for the switch element, which need not be discussed for the present invention.

In one example, each switch element 112 is an eight-channel to eight-channel packet routing unit integrated on a single CMOS chip. One embodiment of a switch chip is described in detail in U.S. Pat. No. 5,546,391, entitled "Central Shared Queue Based Time Multiplexed Packet Switch With Deadlock Avoidance", issued on Aug. 13, 1996, and assigned to International Business Machines Corporation, which is hereby incorporated herein by reference in its entirety.

Figure 3:
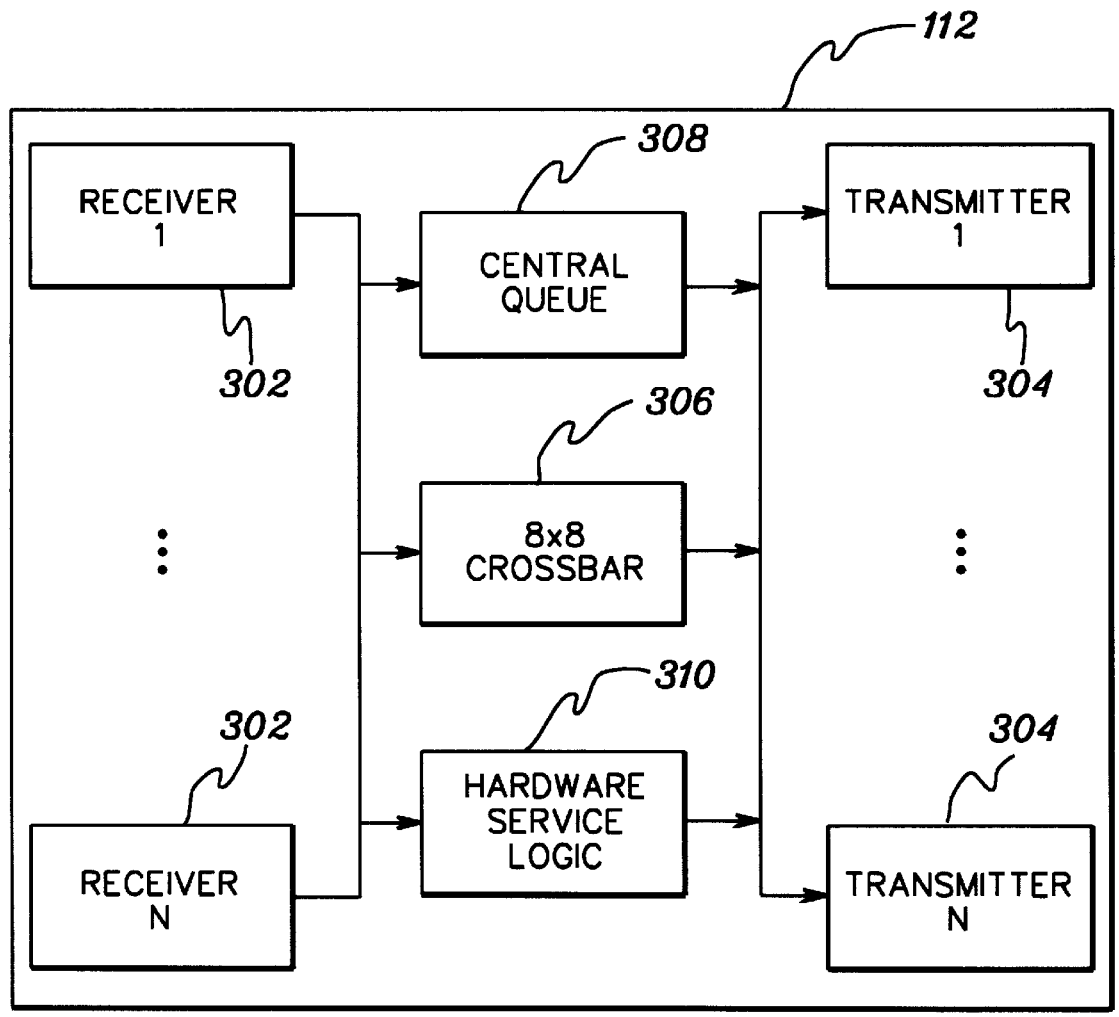
FIG. 3 depicts one example of a switch element, in accordance with the principles of the present invention.

One embodiment of a switch element 112 (e.g., a switch chip) is also described in detail with reference to FIG. 3. In one example, a switch element 112 includes a plurality of receiver modules 302 (e.g., eight modules), one for each input port of the switch element, and a plurality of transmitter modules 304 (e.g., eight modules), one for each output port of the switch element.

Switch element 112 also includes, an unbuffered crossbar 306 that allows packets to pass directly from the receivers to the transmitters, when the designated output port is available. It further includes a central queue 308 that implements a buffered, time-multiplexed eight-way router. The central queue receives messages from the receivers and stores them in the queue when the appropriate output port is busy. Thereafter, upon request from the appropriate transmitter, the queue passes the message to the transmitter.

Additionally, switch element 112 includes hardware service logic 310 used during operation of the switch element. In particular, the hardware service logic receives messages from the receive ports, processes the messages, and acknowledges the operation by transmitting a message through a switch transmitter to a processing node of the system. Further, in accordance with the principles of the present invention, the hardware service logic provides the error reporting capability of the present invention.

One embodiment of the hardware service logic used for the error reporting capability of the present invention is described in detail with reference to FIG. 4. In one example, the functions described below are implemented using hardware state machines.

Figure 4:
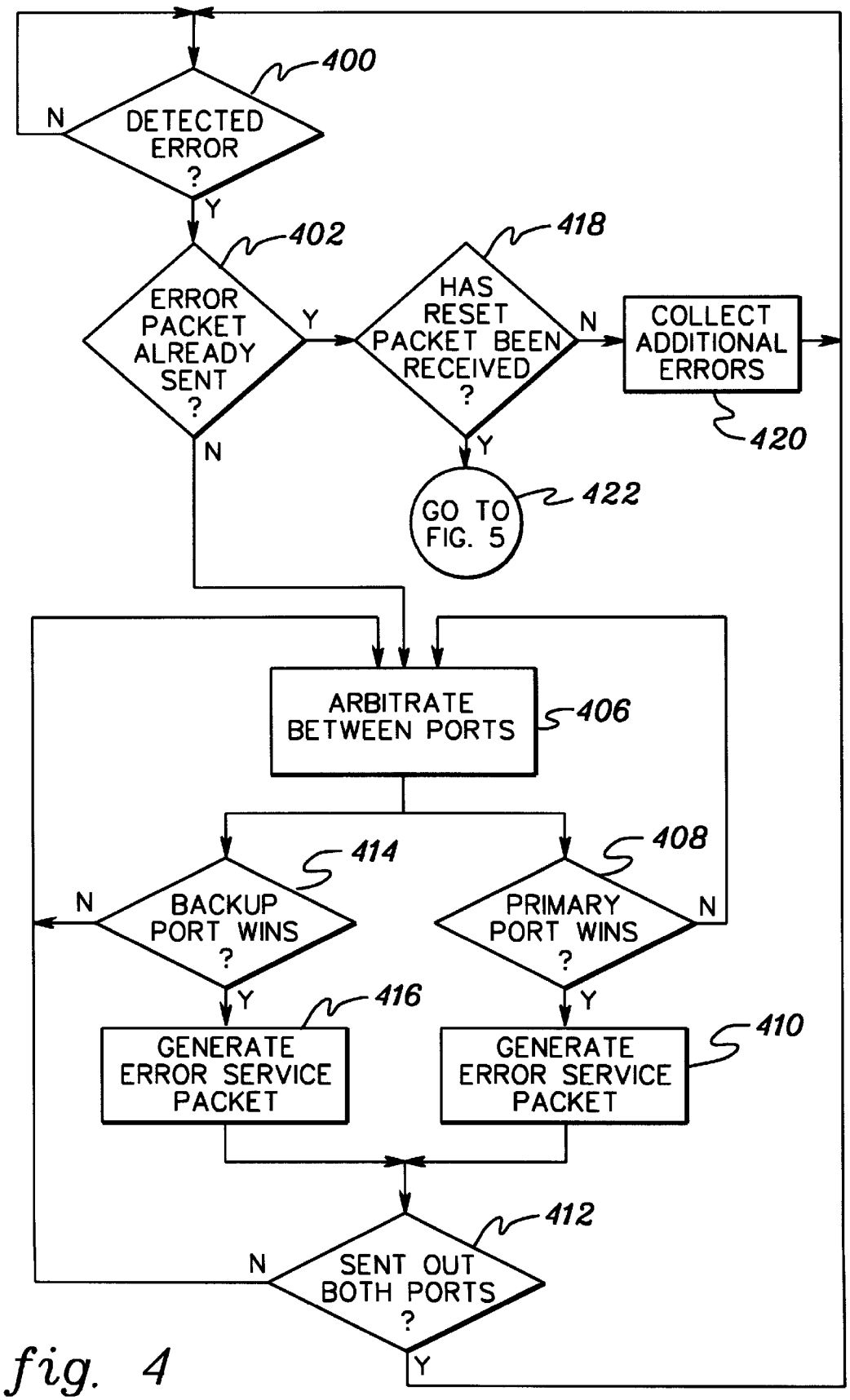
FIG. 4 depicts one embodiment of the hardware service logic used in reporting an error detected by the switch element of FIG. 3, in accordance with the principles of the present invention.

Referring to FIG. 4, initially, a determination is made as to whether the switch element has detected an error, such as, for instance, a parity error, a cyclic redundancy check error (CRC) or a sequence error, INQUIRY 400. For example, the switch element checks if there is a sequence error by checking the current state in a state machine within the switch element to determine if it is at the expected state. If it is not at the expected state, then an error has occurred. If, however, the state is proper, then there is no sequence error.

When an error has not been detected, flow returns to INQUIRY 400 such that the determination can be made at preselected time intervals. If, on the other hand, an error has been detected, then processing continues, as described below.

A determination is made as to whether an error message has already been sent, INQUIRY 402. For instance, a check is made to determine whether an error service packet containing the error has already been sent, by the switch element, to a designated processing node. In one example, this determination is made by checking a bit within the switch element that indicates whether or not the error service packet has been sent.

When the error service packet has not been sent, access is requested to, for instance, two ports: a primary port and a secondary port, in order to send the packet, STEP 406. The designation of the ports is provided to the switch element during initialization, as described above. When access is requested, each port sends back an acknowledgement and the first one received, is the first one to be used in sending out the message. For instance, if the primary port is the first port to send back the acknowledgement, INQUIRY 408, then an error service packet designated for the first designated processing node (e.g., the primary node) is generated, STEP 410.

In one example, the error service packet includes a beginning of packet control character; the route to the first designated processing node, as provided during initialization of the switch element; a command indicating that an error has occurred; an identification of the switch element, provided during initialization; the error data, which indicates which error bits are active; a cyclic redundancy check, which includes a checking pattern to be used by the communications adapter at the first designated node to ensure the data has not been corrupted; and an end of packet control character. The beginning and ending control characters delineate the beginning and ending of the packet, such that the hardware does not need to keep track of the length of the packet or other similar types of information.

Subsequent to creating the error service packet, the packet is sent out to the first designated processing node using standard transmission techniques. At the first designated processing node, the communications adapter receives the packet, buffers it and passes it along to the processor of that processing node.

After sending the packet out the primary port, a check is made to determine whether the packet was sent out both ports, INQUIRY 412. When the packet has not been sent out both ports, flow returns to STEP 406, "ARBITRATE BETWEEN PORTS." This time the switch knows that it has already sent the packet out the primary port, so it selects the backup port, INQUIRY 414.

Thereafter, an error service packet is generated for reporting the error to the second designated processing node (e.g., the backup node), STEP 416. This packet includes the same information as described above with the primary packet, except the designated route is to the backup processing node instead of the primary processing node.

Once the packet has been sent out both ports, INQUIRY 412, flow returns to INQUIRY 400, "DETECTED ERROR."

Returning to INQUIRY 402 "ERROR PACKET ALREADY SENT?", when the error packet has already been sent, a determination is made as to whether a reset service packet for the error has been received by the switch element, INQUIRY 418. In one embodiment, this determination is made by the switch element checking the commands of the incoming service packets.

When the commands indicate that the reset service packet has not been received, additional errors are collected so that the system does not become flooded with error messages, STEP 420. Specifically, no other error service packets are forwarded from the switch element until the reset service packet is received. Processing then returns to INQUIRY 400 "DETECTED ERROR?".

Figure 5:
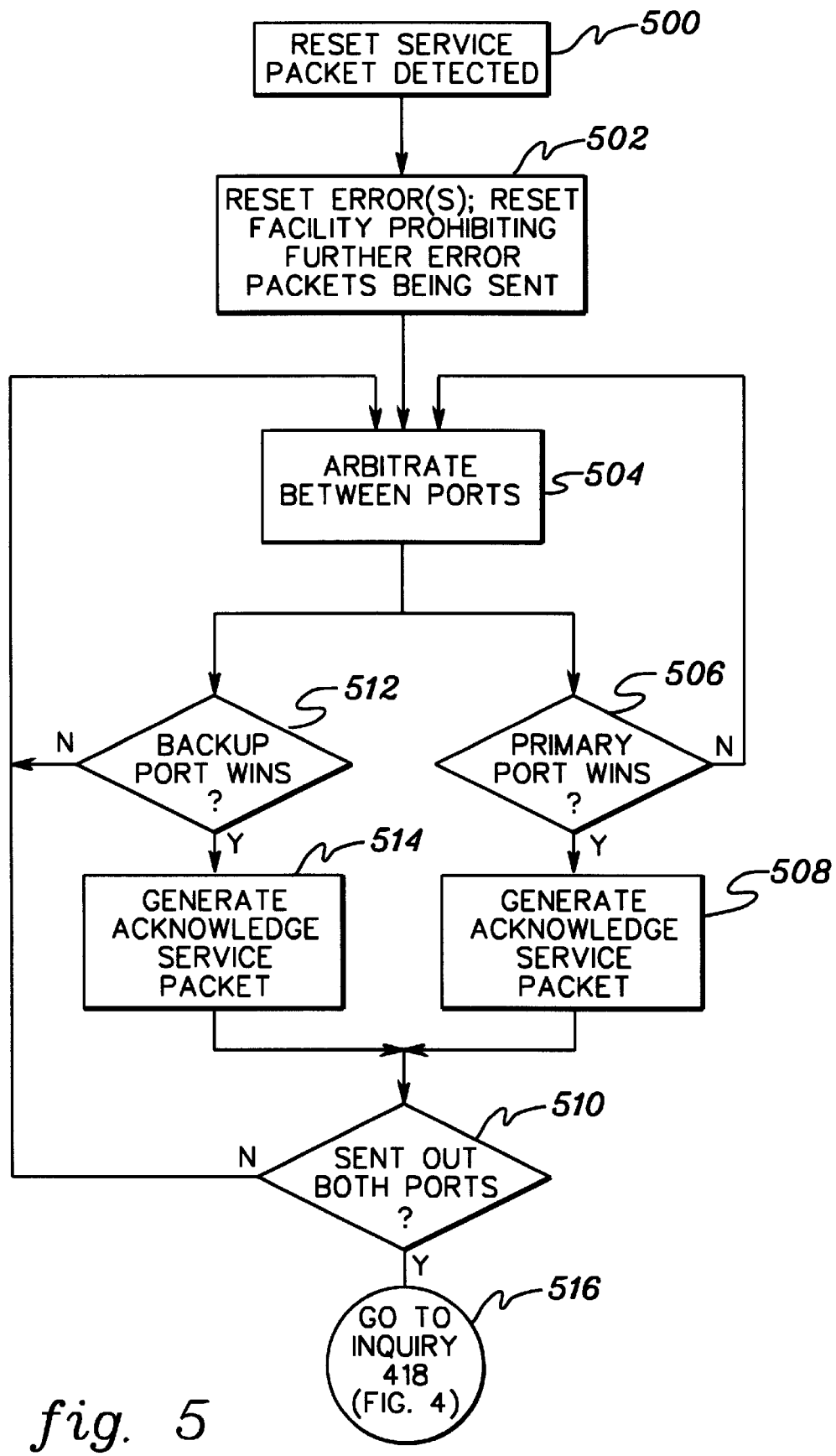
FIG. 5 depicts one embodiment of the hardware service logic used in acknowledging, by the switch element of FIG. 3, receipt of a reset service packet and the forwarding of additional errors, in accordance with the principles of the present invention.

Returning to INQUIRY 418, if, however, a reset service packet has been received for the sent error service packet, then processing continues with FIG. 5 (STEP 500), STEP 422. In one embodiment, the functions of FIG. 5 are implemented using hardware state machines.

Referring to FIG. 5, in one example, at least one of the designated nodes that received the error packet generates a reset service packet. In one example, the reset service packet includes a command, indicating this is a reset packet, and the reset data. After generating the reset service packet, the designated node sends the packet to the switch element identified in the error service packet, and the switch element detects that it has received the reset packet, STEP 500.

Subsequent to receiving the reset service packet, the switch element resets the errors using the reset data (e.g., by resetting the error bits) and resets the facility prohibiting further error packets from being sent, STEP 502. In one example, the facility is reset by resetting the corresponding bit.

Next, a selection is made as to which port the reset packet is to be transmitted on, STEP 504. If the primary port is initially selected (i.e., the first to acknowledge the request), INQUIRY 506, then an acknowledge service packet is generated, STEP 508. In one embodiment, the acknowledge service packet includes the same information as that described above with the error service packet for the first designated processing node; however, the error data includes all the errors that were collected at STEP 420 (FIG. 4). In particular, the acknowledge service packet includes a beginning of packet control character, a route to the primary node, a command designating it is an error, a switch element id, all of the collected error data, a CRC and an end of packet control character. After generating the acknowledge service packet, it is transmitted to the primary processing node.

If the packet has not been sent out on both ports, INQUIRY 510, then processing continues with STEP 504 "ARBITRATE BETWEEN PORTS." This time the secondary port is selected, INQUIRY 512, thus an acknowledge service packet is generated for the second designated processing node, STEP 514. Again, this packet is generated as described above for the acknowledge packet for the primary node, except that the designated route is for the backup node.

Once the packets have been sent out both ports, processing continues with INQUIRY 418 "HAS RESET PACKET BEEN RECEIVED?" for the new error messages included in the last reset packet, STEP 516.

In the above embodiment, the error/acknowledgement is reported to two processing nodes. This is only one example. In another embodiment, the redundancy is eliminated and only one processing node is transmitted the error/acknowledgement. Further, in another embodiment, the packet is not necessarily sent to another processing node, but instead is sent to the same processing node via another route. All of these variations plus others are considered within the scope and spirit of the present invention.

Described above is a mechanism by which a switch element reports a detected error to one or more designated processing nodes of a distributed computer system. However, in another embodiment, if error information is lost, a processing node can request an error status packet from the switch element.

In a further embodiment of the invention, the communications adapter, which is also a hardware component of the distributed computer system, detects and reports errors to one or more designated processing nodes.

One example of a communications adapter is described in detail with reference to FIG. 6, and one embodiment of the logic associated with the reporting capability of the communications adapter is described in further detail with reference to FIG. 7.

Figure 6:
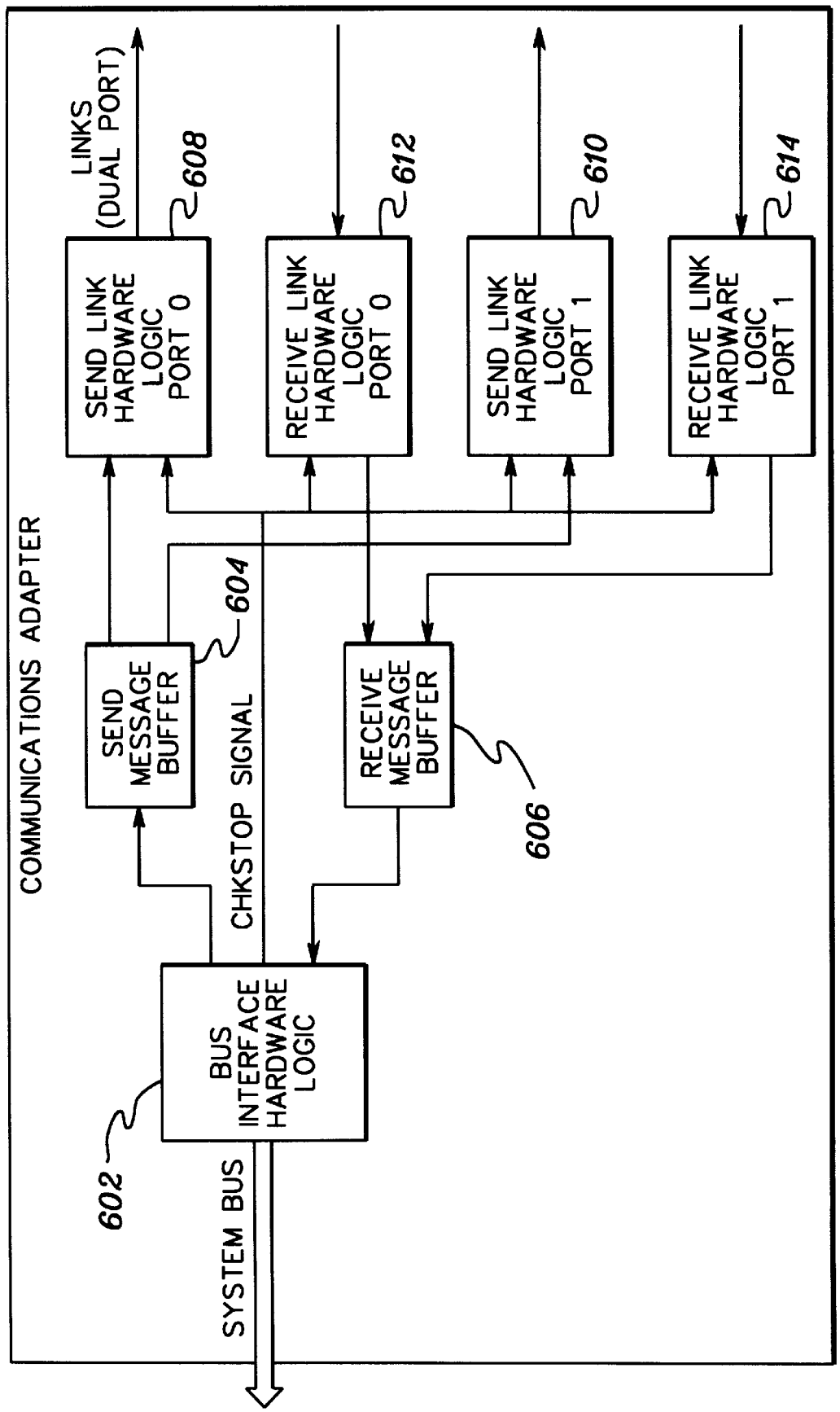
FIG. 6 depicts one example of a communications adapter of the distributed computer system of FIG. 1, in accordance with the principles of the present invention.

Referring to FIG. 6, in one instance, a communications adapter 600 includes bus interface hardware logic 602, a send message buffer unit 604, a receive message buffer unit 606, send link hardware logic 608, 610, and receive link hardware logic 612, 614, each of which is described below.

Bus interface hardware logic 602 interfaces between the remaining components of the communications adapter and the system bus, which connects the communications adapter to its corresponding processor on the processing node. It receives error information from the other adapter components and/or from the processor, and sends out a CHKSTOP error signal, when a critical error is detected.

The bus interface is coupled to send message buffer 604, which receives messages from bus interface hardware logic 602. The send message buffer buffers unpacketized messages for later transmission, and reports any errors it detects back to bus interface hardware logic 602.

The send message buffer is coupled to send link hardware logic 608 and send link hardware logic 610, which are dual ports used in transmitting messages to the interconnection network. Each send link hardware logic packetizes, buffers and send messages out a given link to the interconnection network. Additionally, it reports any detected errors to the bus interface logic. When the send link hardware logic receives an active CHKSTOP signal, it interrupts the current state (stored, for instance, in a state machine) and sends an error service packet, as described in further detail below. Thereafter, the link logic goes idle until a reset has been received.

In addition to the dual port send links, the communications adapter also includes dual port receive links—receive link hardware logic 612 and 614. The receive link hardware logic receives message packets from the link connecting the communications adapter to the interconnection network. It passes the received data to receive message buffer 606, and reports any errors to bus interface logic 602. Additionally, it stops its operation, if the CHKSTOP signal is active.

The receive links are coupled to receive message buffer 606, which receives the data from the links and passes the data to the bus interface logic. It also reports any detected errors to the bus interface logic.

In accordance with the principles of the present invention, the communications adapter is initialized by the local processor corresponding to the adapter. For example, the local processor supplies the routes to the designated processing nodes, the identification of the adapter and any other information needed for initialization. When the adapter receives the information, it is stored within hardware storage elements of the adapter.

As described above, the communications adapter spontaneously reports any detected critical errors to one or more designated processing nodes, such that the processing nodes need not poll the communications adapter to determine if an error has occurred. The hardware logic used, in accordance with the principles of the present invention, to report any such errors is further described with reference to FIG. 7. In one example, the functions described below are implemented using hardware state machines of the different components of the communications adapter.

Figure 7:
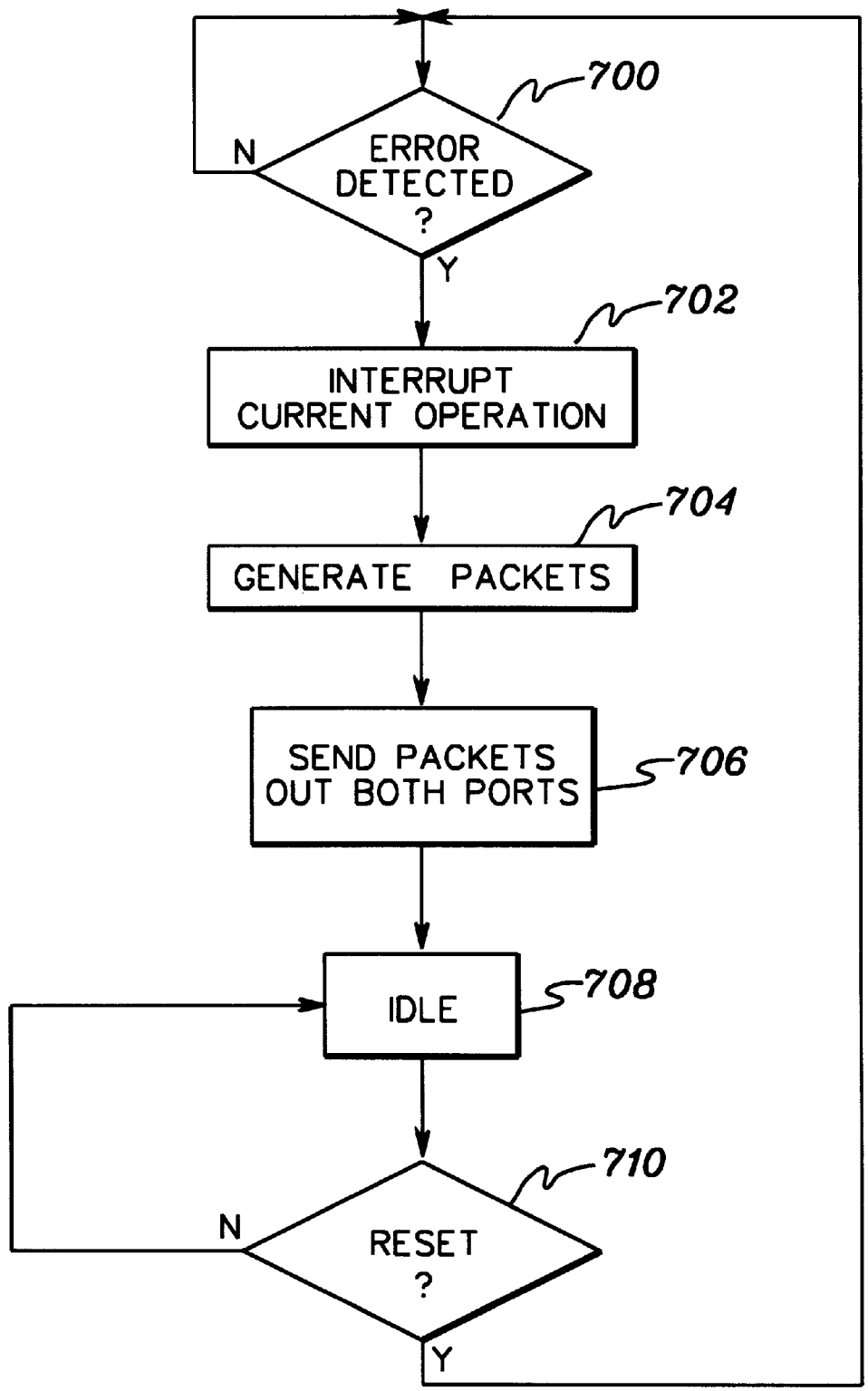
FIG. 7 depicts one embodiment of the hardware service logic used in reporting an error detected by the communications adapter of FIG. 6, in accordance with the principles of the present invention.

Referring to FIG. 7, initially, a determination is made as to whether the communications adapter has detected a critical error, INQUIRY 700. This determination is made in a similar manner to detecting an error by a switch element. When no critical error has been detected, then the check is made again, INQUIRY 700. However, when a critical error has been detected, then the communications adapter interrupts current operation by taking itself off-line (e.g., placing itself in an interrupt state), STEP 702.

Subsequently, error service packets (also referred to as Check Stop packets) are generated for transmission to one or more designated processing nodes, STEP 704. In one example, an error service packet is generated for a first designated processing node and another packet is generated for a second designated processing node. Each error packet includes similar information as described above with reference to the error service packets generated by the switch element. For instance, each includes a beginning of packet control character, a route to either the primary or secondary node, an error command, an adapter identification, the error data, a cyclic redundancy check and an end of packet control character.

After, the packets are generated, the packet for the first designated processing node is sent out a designated primary port and the packet for the second designated processing node is sent out a designated secondary port, STEP 706. The use of two ports increases the probability that one of the packets will get through the system to one of the designated nodes or through one of the designated routes.

Thereafter, the communications adapter remains idle until the adapter is reset in order to prevent more errors from propagating, STEP 708. Once the adapter has been reset by its corresponding processor, INQUIRY 710, flow returns to INQUIRY 700 "ERROR DETECTED?".

In the embodiment described above, critical errors are reported to the designated processing nodes. Non-critical errors that are detected by the adapter are reported only to the local processor. However, in another embodiment, all errors can be reported to the designated processing nodes.

As with the switch mechanism, in another embodiment, the error packet need not be sent out two ports. Additionally, the packet can be sent to the same processing node via two (or more) routes. These and other embodiments are considered within the scope and spirit of the claimed invention.

The error reporting capability of the present invention eliminates the need to monitor the devices for failures, resulting in less contention for routes or segments of route paths. When an error is detected, it is reported by either a switch element or an adapter through a service packet. Additional error packets are not cluttering the system, since the switch element only collects the additional errors and does not report them until after a reset service packet is received. The adapter takes itself offline, thus, keeping the system from being cluttered with subsequent error packets and allowing the rest of the system to function normally.

The mechanism of the present invention further provides a high degree of fault tolerance in the event that a failed component is in one of the reporting paths.

The distributed computer system described herein is only one example. The reporting capability of the present invention can be incorporated within and/or used with other systems without departing from the spirit of the present invention. For instance, different architectures and/or hardware components can be used without departing from the spirit of the present invention. Additionally, other hardware components, other than state machines, can be used to implement the hardware logic of the present invention.

In addition to the above, in another embodiment, detected errors are reported only after a count of an occurrence of an error reaches a threshold. When the threshold is reached, then the errors are reported, in accordance with the principles of the present invention.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of reporting errors in a distributed computer system, said method comprising:

generating an error message, by a hardware element of said distributed computer system, when an error is detected, said generating comprising creating a service packet comprising said error message and a route to a first designated processing node, wherein said route defines a path to be taken from said hardware element to said first designated processing node; and forwarding said error message from said hardware element to said first designated processing node using said path.

2. The method of claim 1, wherein said hardware element comprises one of a switch element and a communications adapter.

3. The method of claim 1, wherein said forwarding further comprises sending said error message from said hardware element to a second designated processing node of said distributed computer system.

4. A method of reporting errors in a distributed computer system, said method comprising:

generating an error message, by a hardware element of said distributed computer system, when an error is detected;

forwarding said error message from said hardware element to a first designated processing node of said distributed computer system; and collecting, by said hardware element, additional errors prior to receiving, by said hardware element, an indication that said error message has been received by said first designated processing node.

5. The method of claim 4, further comprising acknowledging receipt of said indication, said acknowledging further comprising forwarding additional error messages for said additional errors to at least one of said first designated processing node and a second designated processing node of said distributed computer system.

6. A method of reporting errors in a distributed computer system, said method comprising:

generating an error message, by a communications adapter of said distributed computer system, when an error is detected;

interrupting current operations of said communications adapter prior to generating said error message; and forwarding said error message from said communications adapter to a first designated processing node of said distributed computer system.

\* \* \* \* \*

UNITED STATES PATENT AND TRADEMARK OFFICE
CERTIFICATE OF CORRRECTION

PATENT NO. : 5,923,840
DATED : July 13, 1999
INVENTOR(S) : Christine Marie Desnoyers, et al.

It is certified that error appears in the above-identified patent and that said Letters Patent is hereby corrected as shown below:

On the title page, insert the following, in item [56]:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 7 | 8 | 4 | 5 | 4 | 7 | 07/98 | Dittmar et al. | | | |
| | | 5 | 7 | 5 | 8 | 0 | 5 | 3 | 05/98 | Takeuchi et al. | | | |
| | | 5 | 6 | 4 | 0 | 5 | 0 | 4 | 06/97 | Johnson Jr. | | | |
| | | 5 | 5 | 9 | 0 | 1 | 1 | 8 | 12/96 | Nederlof | | | |
| | | 5 | 5 | 2 | 2 | 0 | 4 | 6 | 05/96 | McMillen et al. | | | |
| | | 5 | 5 | 1 | 9 | 6 | 9 | 3 | 05/96 | Galuszka et al. | | | |
| | | 5 | 4 | 1 | 0 | 6 | 5 | 0 | 04/95 | Sasaki et al. | | | |
| | | 4 | 9 | 6 | 7 | 3 | 4 | 4 | 10/90 | Scavezze et al. | | | |
| | | 4 | 8 | 0 | 7 | 2 | 2 | 8 | 02/89 | Dahbura et al. | | | |
| | | 4 | 7 | 0 | 9 | 3 | 6 | 5 | 11/87 | Beale et al. | | | |

Signed and Sealed this

Twenty-sixth Day of October, 1999

Attest:

Q. TODD DICKINSON

*Attesting Officer*    *Acting Commissioner of Patents and Trademarks*